(12) United States Patent
Figeys et al.

(10) Patent No.: US 12,480,814 B2
(45) Date of Patent: *Nov. 25, 2025

(54) DEVICE AND A METHOD FOR POLARIZATION DEPENDENT IMAGING

(71) Applicant: IMEC VZW, Leuven (BE)

(72) Inventors: Bruno Figeys, Herent (BE); Robert Gehlhaar, Herent (BE); Jan Genoe, Testelt (BE)

(73) Assignee: IMEC VZW, Leuven (BE)

( * ) Notice: Subject to any disclaimer, the term of this patent is extended or adjusted under 35 U.S.C. 154(b) by 309 days.

This patent is subject to a terminal disclaimer.

(21) Appl. No.: 18/203,125

(22) Filed: May 30, 2023

(65) Prior Publication Data

US 2023/0392984 A1 Dec. 7, 2023

(30) Foreign Application Priority Data

Jun. 1, 2022 (EP) .................................... 22176654

(51) Int. Cl.
*G01J 3/28* (2006.01)
*G01J 1/04* (2006.01)
(Continued)

(52) U.S. Cl.
CPC ........... *G01J 3/2823* (2013.01); *G01J 1/0422* (2013.01); *G01J 3/0205* (2013.01); *G01J 3/0216* (2013.01);
(Continued)

(58) Field of Classification Search
CPC ...... G01J 3/2823; G01J 1/0422; G01J 3/0205; G01J 3/0216; G01J 3/0224; G01J 3/0229;
(Continued)

(56) References Cited

U.S. PATENT DOCUMENTS

| 5,852,691 A | * | 12/1998 | Mackie | .................. | G02B 6/126 |
| | | | | | 385/47 |
| 8,384,818 B2 | * | 2/2013 | Hiramoto | ............ | H10F 39/8053 |
| | | | | | 348/340 |

(Continued)

FOREIGN PATENT DOCUMENTS

| WO | WO-2013/188520 A2 | 12/2013 |
| WO | WO-2013/188520 A3 | 12/2013 |

(Continued)

OTHER PUBLICATIONS

Garner, et al., Vertically Integrated Waveguide Polarization Splitters Using Polymers, IEEE Photonics Technology Letters, vol. 11, No. 7, Jul. 1999.

(Continued)

*Primary Examiner* — Dominic J Bologna
(74) *Attorney, Agent, or Firm* — MOSER TABOADA (57) ABSTRACT

According to an aspect of the present inventive concept there is provided a device for polarization dependent imaging, comprising a detector comprising an array of light sensitive elements; a plurality of light propagating units, each comprising: a funnel element having a collecting end and a transmitting end, the funnel element being configured to collect light at the collecting end and propagate the light to the transmitting end; a waveguide having a receiving end and a distributing end, the waveguide being configured to receive the light from the transmitting end at the receiving end and propagate the light to the distributing end, wherein the waveguide is configured to propagate the light through the waveguide in dependence of polarization such that a distribution of the light at different locations of the distributing end is dependent on polarization of the light.

15 Claims, 5 Drawing Sheets

(51) Int. Cl.
  *G01J 3/02* (2006.01)
  *G01J 4/04* (2006.01)
(52) U.S. Cl.
  CPC .......... *G01J 3/0224* (2013.01); *G01J 3/0229* (2013.01); *G01J 3/0256* (2013.01); *G01J 3/2803* (2013.01); *G01J 4/04* (2013.01); *G01J 2003/282* (2013.01); *G01J 2003/2826* (2013.01)
(58) Field of Classification Search
  CPC .......... G01J 3/0256; G01J 3/2803; G01J 4/04; G01J 2003/282; G01J 2003/2826
  See application file for complete search history.

(56) References Cited

U.S. PATENT DOCUMENTS

| | | | | |
|---|---|---|---|---|
| 9,105,540 | B2* | 8/2015 | Ikemoto | H10F 39/8067 |
| 9,581,762 | B2* | 2/2017 | Wertsberger | G01J 3/0216 |
| 2011/0249161 | A1* | 10/2011 | Takagi | H10F 39/806 |
| | | | | 348/294 |
| 2015/0301275 | A1* | 10/2015 | Andle | H01Q 13/0208 |
| | | | | 385/43 |
| 2021/0026070 | A1* | 1/2021 | Genoe | G02B 6/12004 |
| 2022/0004016 | A1 | 1/2022 | Roberts et al. | |
| 2022/0345600 | A1* | 10/2022 | Amitonova | G02B 23/2423 |
| 2023/0280208 | A1* | 9/2023 | Genoe | H04N 13/324 |
| | | | | 356/326 |
| 2024/0210245 | A1* | 6/2024 | Ali | G02B 27/283 |
| 2024/0210641 | A1* | 6/2024 | Ali | G01J 3/0205 |

FOREIGN PATENT DOCUMENTS

| | | |
|---|---|---|
| WO | WO-2020/080944 A1 | 4/2020 |
| WO | WO-2022/017681 A1 | 1/2022 |

OTHER PUBLICATIONS

Shramkova, et al., Optical Efficiency Enhancement of Nanojet-Based Dielectric Double-Material Color Splitters for Image Sensor Applications, Nanomaterials 2021, 11, 3036.

Rubin, et al., Matrix Fourier optics enables a compact full-Stokes polarization camera, Science 365, 43 (2019), Jul. 5, 2019.

Camayd-Muñoz, et al., Multifunctional volumetric meta-optics for color and polarization image sensors, vol. 7, No. 4 / Apr. 2020 / Optica.

Arbabi, et al., Full-Stokes Imaging Polarimetry Using Dielectric Metasurfaces, ACS Photonics 2018, 5, 3132-3140.

Zhao, et al., Perfect RGB-IR Color Routers for Sub-Wavelength Size CMOS Image Sensor Pixels, Adv. Photonics Res. 2021, 2, 2000048.

Nishiwaki, et al., Efficient colour splitters for high-pixel-density image sensors, Nature Photonics, vol. 7, Mar. 2013.

Nishiwaki, et al., Supplementary Information for Efficient colour splitters for high-pixel-density image sensors, Nature Photonics, 2013.

Johlin, Eric, Nanophotonic color splitters for high-efficiency imaging, iScience 24, 102268, Apr. 23, 2021.

Extended European Search Report for Application No. EP22176654.6 dated Nov. 23, 2022.

* cited by examiner

DEVICE AND A METHOD FOR POLARIZATION DEPENDENT IMAGING

CROSS-REFERENCE TO RELATED APPLICATIONS

The present application claims the benefit of and priority to EP Patent Application Serial No. 22176654.6, filed Jun. 1, 2022, the entire contents of which is incorporated herein by reference.

TECHNICAL FIELD

The present inventive concept relates to polarimetric imaging, and more specifically to a device and a method for polarization dependent imaging.

BACKGROUND

Imaging techniques using detection of several different properties of light, such as different types of polarizations and/or different wavelengths, have found widespread application ranging from polarimetric detection enabling 3D sensing and improved object identification, as well as multi-spectral detection for scientific measurements to photographic imaging. In order to distinguish between light of different properties, imaging devices such as digital cameras typically comprise filter arrays covering the pixels. For polarimetric imaging, the filter arrays may comprise sets of different polarization filters to filter out certain polarization types, such that different pixels on the imaging device detect light intensity within different types of polarization. The acquired signals from the different pixels may be used to represent the intensity of the respective polarization types, and based on the measured intensities the polarization content of the incident light may be determined. Similarly, for multi-spectral imaging, the filter arrays may comprise sets of color filters. A common example is cameras for photography comprising filter arrays for the colors red, green, and blue, allowing the three separate colors to be detected by respective pixels of the imaging detector.

However, conventional filters reduce the intensity of the incident light before it reaches the detector, thereby effectively reducing the sensitivity of the imaging device. For example, conventional polarization filters may discard more than 50% of the incident light.

On the other hand, detector development is driven towards obtaining higher resolution images, and thus towards smaller pixel size. With decreasing pixel size, it is growing increasingly difficult to obtain good image quality, especially at low light conditions.

Hence, there is a need in the art for further improvements related to light sensitivity and thus to downscaling of imaging devices related to polarimetric imaging.

SUMMARY

An objective of the present inventive concept is to mitigate, alleviate or eliminate one or more of the above-identified deficiencies in the art and disadvantages singly or in any combination. These and other objectives are at least partly met by the invention as defined in the independent claims. Preferred embodiments are set out in the dependent claims.

According to a first aspect, there is provided a device for polarization dependent imaging, the device comprising:

a detector comprising a plurality of light sensitive elements, wherein each light sensitive element is configured to generate an electric signal dependent on an intensity of light incident onto the light sensitive element;

a plurality of light propagating units, wherein each light propagating unit of the plurality of the light propagating units comprises:

a funnel element having a collecting end and a transmitting end, the funnel element being configured to collect light incident at the collecting end and to propagate the light to the transmitting end, wherein a cross-section of the collecting end is larger than a cross-section of the transmitting end;

a waveguide having a receiving end and a distributing end, the waveguide being configured to receive the light from the transmitting end at the receiving end and to propagate the light to the distributing end, wherein the waveguide is a multimode waveguide configured to propagate the light through the waveguide in dependence of polarization such that a distribution of the light at different locations of the distributing end is dependent on polarization of the light;

wherein the funnel element and the waveguide are asymmetrically coupled such that a central axis of the funnel element at the transmitting end is displaced with respect to a central axis of the waveguide at the receiving end; and wherein, for each light propagating unit, the light propagating unit is arranged with respect to the detector such that the light at the distributing end is incident onto at least two light sensitive elements of the plurality of light sensitive elements.

By the term "polarization dependent imaging" is here meant detection of light such that for each of a plurality of spatial positions on an imaged object, information related to the polarization of the light from the corresponding spatial position is detected.

In this context the term "light" should be allowed a broad interpretation, not limited to visible electromagnetic radiation. Rather, the term "light" may also include for example ultraviolet light, infrared light, or combinations thereof.

By the term "light sensitive element" is here meant an element reacting to light impinging onto the element, by generating an electric signal as a response to the light intensity. A plurality of light sensitive elements may be arranged on a detector, configured to allow read-out of the electric signals representing light for image acquisition. Given as non-limiting examples, light sensitive elements may be found on photodiodes, photo-multiplier tubes (PMT), and pixels on image detectors such as charge-coupled devices (CCD) and complementary metal oxide semiconductors (CMOS). By way of example, a plurality of light sensitive elements may be in the form of pixels on a CCD or CMOS detector, but may alternatively comprise a plurality of any other type of light sensitive elements.

By way of example, the plurality of light sensitive elements may be arranged in a plane of the detector, wherein the plane is a planar surface of the detector.

The plurality of light sensitive elements may be provided in any arrangement in the detector. The plurality of light sensitive elements may be arranged in relation to the light propagating units such that the plurality of light sensitive elements is adapted to detect light so as to facilitate determining polarization of the light. This may imply that the light sensitive elements may have different sizes and shapes and may be irregularly arranged in a plane of the detector.

According to an embodiment, the plurality of light sensitive elements is arranged in an array forming an array of light sensitive elements. Thus, the plurality of light sensitive elements may be arranged in a regular manner. This may facilitate manufacturing of the detector.

By way of example, the light sensitive elements may be arranged in rows and columns forming the array of light sensitive elements.

Typically, the light sensitive elements are in the shape of a square, however it is conceivable that the light sensitive elements may alternatively be of another shape, such as a rectangular, circular, or elliptical shape.

By way of example, all light sensitive elements may be of the same size. However, it is conceivable that the light sensitive elements are of different sizes. For example, light sensitive elements closer to an outer edge of the array may be larger than light sensitive elements closer to a center of the array. By the present arrangement, the larger size of light sensitive elements at the edges of the detector may compensate for a lower light intensity at the edges as compared to the light intensity closer to the center of the detector. In embodiments wherein the sizes of the different light sensitive elements are different, it is conceivable that the light sensitive elements are arranged in a different pattern than in straight rows and columns.

By the term "light propagating unit" is here meant any unit, device, and/or element with the capability of propagating light based on the polarization of the light. Given only as an example, incident light of several different types of polarization may have different spatial distribution of intensity by having a direction of propagation altered based on the type of polarization of the light, such that different types of polarization take different directions. By the present arrangement, different types of polarizations may reach different locations of the distributing end. It should, however, be realized that the light propagating unit may not necessarily completely separate different types of polarization in different directions. Rather, the light propagating unit may provide a spatial distribution of light in a cross-section of the light propagating unit (such as at the distributing end), wherein the spatial distribution of light is different for different types of polarization.

The light propagating unit comprises a funnel element having a collecting end and a transmitting end. The funnel element is configured to collect light incident at the collecting end and to propagate the collected light to the transmitting end. In order for the collecting end to collect as much light as possible, the cross-section of the collecting end is large. The funnel element is tapered such that the cross-section of the collecting end is larger than the cross-section of the transmitting end. By way of example, the funnel element may be tapered such that the light may be confined to a very small area at the transmitting end having a size in the same order of magnitude as the wavelength of the light.

The collecting end may be configured to collect spots of focused light, the size of which may be defined by the Abbe diffraction limit. The Abbe diffraction limit is dependent on the wavelength of the light and on the numerical aperture of the imaging lens. By way of example, if the wavelength of the light is in the visible part of the electromagnetic spectrum, a width of the collecting end may be around 500 nm.

At the transmitting end the funnel element may essentially be a single mode waveguide. By way of example, the single mode waveguide may be made of Silicone Nitride with a refractive index of about 2.0. By the present arrangement, if the wavelength of the light is in the visible part of the electromagnetic spectrum, the transmitting end may have a width of around 200 nm.

It serves to mention that the layer forming the funnel element comprising the tapers from the collecting end to the transmitting end, as for example from 500 nm to 200 nm, may preferably be made to have a thickness not being too large. Thick layers may result in stress in the layers, and/or may suffer from deposition problems during manufacturing or errors in alignment between the elements of the light propagating units. By way of example, the layer forming the funnel element may have a thickness of 2 μm, 3 μm, or 4 μm. The different thicknesses yield different angles of tapering from the collecting end to the transmitting end.

The light propagating unit further comprises a waveguide having a receiving end and a distributing end. The waveguide is configured to receive the light from the transmitting end of the funnel element at the receiving end of the waveguide. The waveguide may have a cross-section at the receiving end that is smaller than the cross-section of the collecting end of the funnel element. Thus, in order for all light collected at the collecting end to be coupled into the waveguide, the funnel element is tapered such that the transmitting end of the funnel element has a cross-section that is not larger than the cross-section of the receiving end of the waveguide. Typically, the funnel element is tapered such that the transmitting end of the funnel element has a cross-section that is smaller than the cross-section of the receiving end of the waveguide. By the present arrangement, an efficient stacking of the elements facilitating coupling most of the light, and preferably all the light, into the respective light sensitive elements of the detector may be provided.

The receiving end may be facing the transmitting end. The receiving end may be in direct physical contact with the transmitting end. Alternatively, a gap may be formed between the receiving end and the transmitting end. As yet another alternative, the light propagating unit may be made of a single piece of material such that the funnel element and the waveguide are different portions of the single piece.

By way of example, one or more additional layers may be provided between the transmitting end and the receiving end. By way of example, the one or more additional layers may enhance the coupling of light between the funnel element and the waveguide.

The funnel element and the waveguide are asymmetrically coupled. In other words, the central axis of the funnel element at the transmitting end is displaced with respect to the central axis of the waveguide at the receiving end. The central axis of the funnel element may be parallel to the central axis of the waveguide.

The preferred displacement is dependent on the size/width of the transmitting end of the funnel element and on the number of modes that should be excited into the waveguide. Given as a non-limiting example, if the transmitting end has a width of 200 nm and two modes should be excited in the waveguide, typically a preferred displacement may be 100 nm in one direction and no displacement in the other, perpendicular direction. Given as another non-limiting example, if instead four modes should be excited in the waveguide, typically a preferred displacement may be 100 nm in both directions, respectively. As an alternative to exciting four modes in a waveguide of a single light propagating unit, the same light distribution may be provided by a combination of two light propagating units wherein one of the light propagating units has a displacement in one direction and the other light propagating unit has a displacement in the other direction.

The waveguide is further configured to propagate the light from the receiving end to the distributing end. The waveguide may be, but is not required to be, tapered from the receiving end to the distributing end such that a cross-section of the receiving end is larger than a cross-section of the distributing end. Alternatively, the sides of the waveguide may be parallel. As the waveguide is a multimode waveguide, the waveguide will propagate the light through the waveguide in dependence of polarization. In this manner, the distribution of the light at the distributing end is dependent on polarization of the light.

The waveguide may be made by means of an etching technology. The etching technology may introduce some tapering which may be acceptable even for a non-tapered design. For example, the waveguide may have a tapering angle of 89 degrees being very close to 90 degrees corresponding to parallel sides of the waveguide.

Each light propagating unit is arranged with respect to the detector such that the light at the distributing end is incident onto at least two light sensitive elements of the array of light sensitive elements.

Each of the light sensitive elements in combination with a light propagation unit may be arranged to capture light of at least one specific type of polarization. By using at least two light sensitive elements, detection of at least two different types of polarizations may be provided. The incident light may thus be distributed by the propagation through the waveguide being polarization dependent, such that different types of polarization are differently distributed in relation to the light sensitive elements on the detector.

By the present arrangement, substantially all light collected at the collecting end is propagated through the funnel element to the transmitting end and coupled into the waveguide, such that substantially all light collected will be distributed through the distributing end and will be incident onto a light sensitive element of the detector.

As mentioned above, the plurality of light sensitive elements may be arranged in a plane of the detector, wherein the plane is a planar surface of the detector. Each light propagating unit of the plurality of the light propagating units may extend in a direction substantially perpendicular to the plane. More specifically, an optical axis through the light propagating unit, corresponding to the main direction of light propagation may extend substantially perpendicular to the plane of light sensitive elements. The light propagating units may be arranged such that the collecting end of the funnel element is facing away from the detector, and such that the transmitting end of the funnel element is facing towards the detector. At the transmitting end of the funnel element, the waveguide may be arranged such that the receiving end faces away from the detector and thus facing the transmitting end of the funnel element. Further, the distributing end of the waveguide may be facing the plurality of light sensitive elements of the detector.

By way of example, the waveguide and the detector may be arranged such that a gap is formed between the distributing end and the light sensitive elements, or the distributing end and the light sensitive elements may be arranged to be in direct physical contact with each other. In some embodiments, one or more additional layers may be provided between the distributing end and the light sensitive elements. By way of example, the one or more additional layers may enhance the coupling of light between the waveguide and the detector.

The material of which the funnel element and/or waveguide of the light propagating unit is made of may depend on the wavelength range for which the light propagating unit is designed. Given as non-limiting examples, if the light propagating unit is designed for propagation of visible light, materials such as SiN, $TiO_x$, or $NbO_x$ may be used in a $SiO_x$ environment. Given as further non-limiting examples, if the light propagating unit is designed for propagation of light in the near infrared (NIR) range, materials such as Si, amorphous Si, or Carbon rich amorphous silicon may be used.

An advantage with the present inventive concept is that a device for polarization dependent, or polarimetric, imaging may be provided without using conventional polarization filters. By using polarization filters a relatively large portion of the collected light may be discarded, since only a specific polarization will be transmitted. By the present inventive concept, most, or preferably all of the collected light may reach the detector, since light is not filtered out of the optical path, but rather redistributed and/or split into different paths based on polarization.

Another advantage is that by using the combination of the funnel element and the waveguide, the amount of collected light may be increased. Further, a light collection and separation arrangement with low light losses may be provided. This may in turn increase sensitivity of the device, and improved quality of the detected data may be provided.

According to an embodiment, the waveguide is further configured to propagate the light through the waveguide in dependence of wavelength such that a distribution of the light at different locations of the distributing end is dependent on polarization and wavelength of the received light.

As the waveguide is a multimode waveguide, the waveguide may propagate the light through the waveguide in dependence of wavelength in addition to polarization. Given only as an example, incident light of several wavelengths within the wavelength range may be separated or spatially distributed by having a direction of propagation altered based on the wavelength of the light, such that different wavelengths take different directions. In this manner, the distribution of the light at the distributing end is dependent on polarization as well as wavelength of the light.

An advantage with this embodiment is that a device may be provided for combined polarimetric and multispectral/hyperspectral imaging. By the term "multispectral imaging" is here meant imaging detecting image data within at least two, and typically more than two, specific spaced wavelength bands across the electromagnetic spectrum, for each picture element. By the term "hyperspectral imaging" is here meant imaging detecting image data within at least two, and typically more than two, specific continuous wavelength bands across the electromagnetic spectrum, for each picture element. Multispectral/hyperspectral imaging may be used in order to identify a characteristic spectral fingerprint of different portions of an imaged object.

Another advantage is that multispectral/hyperspectral imaging may be provided without using conventional absorbing color filters. By using color filters, a relatively large portion of the collected light may be discarded, since only a specific wavelength band will be transmitted. By the present inventive concept, most, or preferably all of the collected light may reach the detector, since light is not filtered out of the optical path, but rather redistributed and/or split into different paths based on wavelength and polarization.

According to an embodiment, the plurality of light sensitive elements is divided into a plurality of sub-sets of light sensitive elements, wherein all sub-sets of the plurality of sub-sets comprise an equal number of light sensitive elements, and wherein the plurality of light propagating units is divided into a plurality of clusters of light propagating units, wherein all clusters of the plurality of clusters comprise an equal number of light propagating units, and wherein each sub-set of light sensitive elements is associated with a mutually unique cluster of light propagating units.

By the phrase "each sub-set of light sensitive elements is associated with a mutually unique cluster of light propagating units" is here meant that each respective sub-set of light sensitive elements is associated with only one cluster of light propagating units, and vice versa.

Each sub-set of light sensitive elements may represent a picture element, such that each sub-set respectively corresponds to a spatial position on an imaged object, and wherein each picture element comprises information related to the polarization of the light, and wavelength if applicable, from the corresponding spatial position.

The intensity from all the light sensitive elements of a sub-set may represent the full polarization range, and wavelength range when applicable, of the detection range of the device. Depending on the polarization, and optionally also wavelength, content of the incident light, each respective sub-set of light sensitive element may detect a characteristic intensity pattern.

The light sensitive elements in a sub-set of light sensitive elements may have different sizes and shapes and may be irregularly arranged in the plane of the detector.

According to an embodiment, the plurality of light sensitive elements is arranged in an array forming an array of light sensitive elements and the sub-sets of light sensitive elements are arranged forming sub-arrays of light sensitive elements. By way of example, the light sensitive elements of a sub-set may be arranged in rows and columns forming the sub-array of light sensitive elements.

All the sub-arrays may be defined to be of the same shape and size. Given only as non-limiting examples, the sub-array may be of a square or rectangular shape. Given as further, non-limiting examples, the sub-array may be formed by 2 adjacent light sensitive elements along a row and 2 adjacent light sensitive elements along a column such that the sub-array is formed by 2×2 light sensitive elements. Similarly, a sub-array may be formed by 3×3 light sensitive elements, or 4×4 light sensitive elements, or 5×5 light sensitive elements, or 6×6 light sensitive elements.

According to an embodiment, each respective cluster comprises a single light propagating unit being arranged with respect to the sub-set to which the cluster is associated, such that the distributing end distributes the light onto all light sensitive elements of the sub-set.

In present arrangement, all light sensitive elements of the associated sub-set fits within the surface areas of the distributing end of the single light propagating unit. Such an arrangement may be provided for example if the light sensitive elements are small, such as 200 nm×200 nm. Further, the light propagating unit of the present embodiment may distribute light throughout the full polarization and wavelength range for which the device is designed. The light sensitive elements of the associated sub-set may thus detect the characteristic intensity pattern, depending on the polarization, and optionally also wavelength, content of the incident light.

An advantage with the present embodiment is that a device with an improved overall light collection efficiency may be provided. Since all light of the respective picture elements is collected by a single funnel element, and the full range of light is subsequently distributed, most of the light incident onto the collecting end, and possibly all the light, may reach the detector.

According to an embodiment, each respective cluster comprises at least a light propagating unit of a first type and a light propagating unit of a second type, wherein a dependence of polarization in the waveguide of the light propagating unit of the first type is different from a dependence of polarization in the waveguide of the light propagating unit of the second type, and wherein, for each respective cluster, the light propagating units are arranged with respect to the sub-set to which the cluster is associated, such that the distributing ends of the light propagating units in the cluster together distribute light onto all light sensitive elements of the sub-set.

Although only two different light propagating units are described here, namely the first and the second types, it should be understood that a cluster may comprise more than two different types of light propagating units, such as three, four, five or six different types of light propagating units.

The different types of light propagating units may have different propagation characteristics, such that the dependence of light propagation on polarization, and optionally wavelength, may be different for the different types of light propagating units. By way of example, the different types of light propagating units may have different physical geometries.

Therefore, by combining different types of light propagating units, selected to individually distribute a limited range of light, the full range of light that the device is designed to handle, may be distributed jointly by the different light propagating units. In the manner described above, the characteristic intensity pattern may be detected by the associated sub-set of light sensitive elements, depending on the polarization and optionally wavelength of the incident light.

In the present embodiment, the distributing ends of the light propagating units in the cluster together distribute light throughout the full polarization and wavelength range for which the device is designed. The light sensitive elements of the associated sub-set may thus detect the characteristic intensity pattern, depending on the polarization, and optionally also wavelength, content of the incident light.

The combination of a cluster of light propagating units and a sub-set of light sensitive elements may be repeated across the plurality of light sensitive elements of a large detector, thereby providing a detector for polarimetric and optionally also multispectral imaging.

An advantage with the present embodiment is that the clusters of light propagating units may be arranged also on detectors comprising also larger sized light sensitive elements that would otherwise not fit within the surface area of a single distributing end of a light propagating unit.

Another advantage is that a more flexible design may be provided, that may cover a wider range of polarization types and/or wavelength ranges. Combinations of different light propagating units with different properties allows more flexibility in what properties may be detected.

According to an embodiment, the device for polarization dependent imaging further comprises a processing unit configured to perform reconstruction of a polarization content of the light incident onto the light sensitive elements, the reconstruction being based on the electric signals of the light sensitive elements and being performed independently within each sub-set of light sensitive elements, respectively.

The processing unit may define the number of sub-sets such that the entire detector is divided into sub-sets. In this manner the clusters are arranged next to each other, with no light sensitive elements in between the clusters that do not form part of any cluster. Alternatively, the division of the detector into sub-sets may be predefined.

By the term "reconstruction" is here meant the use, for each respective sub-set of light sensitive elements, of a mathematical algorithm onto a characteristic intensity pattern detected by the light sensitive elements within the sub-set, converting the detected pattern into a dataset comprising information on polarization content, and optionally wavelength content, of the incident light.

Given as a non-limiting example, the reconstruction may involve quantifying the response of the sub-set for a substantially complete set of reference data for various known inputs of light. Such a set of reference data may be based on simulations, or it may alternatively be based on experimental data. From such reference data, a matrix may be constructed wherein each column represents the response for a set of polarization, or wavelength, or a combination thereof. To reconstruct the polarization and/or wavelength content of unknown incident light, a pseudoinverse matrix is used onto the detected light of the sub-set.

According to an embodiment, the reconstruction of the polarization content comprises Stokes parameters for a set of polarization types for the light.

According to an embodiment, the processing unit is further configured to perform reconstruction of a wavelength spectrum of the light incident onto the light sensitive elements, the reconstruction being based on the electric signals of the light sensitive elements and being performed independently within each sub-set of light sensitive elements, respectively.

According to an embodiment, each light sensitive element comprises a light absorbing layer configured such that light incident onto the light sensitive element is absorbed by the light absorbing layer, thereby preventing light incident onto the light sensitive element from propagating to adjacent light sensitive elements.

If the light incident onto the plurality of light sensitive elements is allowed to propagate a significant distance, as for example more than 500 nm, the light may spread over several adjacent light sensitive elements causing cross-talk between the light sensitive elements. If this happens, the spatial separation of the light provided by the light propagating units is lost. In order to prevent cross-talk, the light sensitive elements may comprise a light absorbing layer in which light is absorbed after having propagated even very short distances, such that light is prevented from propagating far enough to reach an adjacent light sensitive element.

Given as non-limiting examples, the light absorbing layer may be made of materials being strong absorbers, such as organic compounds or perovskite, as for example MAPI-perovskite and CsPbI.

Given as another non-limiting example, the light absorbing layer may comprise Germanium, which may be a less strong absorber than compared to organic compounds and perovskite.

According to an embodiment, the detector is configured with Deep Trench Isolation, DTI, technology such that each respective light sensitive element is confined by a trench preventing light incident onto the light sensitive element from propagating to adjacent light sensitive elements.

An alternative manner in which cross-talk may be prevented is thus to use confinement around the respective light sensitive elements. DTI effectively functions as out-of-plane silicon waveguides, in which light gets trapped due to total internal reflection.

It is conceivable that cross-talk may be avoided by either using light sensitive elements comprising a light absorbing layer, or by the use of a detector configured with Deep Trench Isolation, DTI, technology, or a combination thereof.

An advantage with either of the two embodiments is that cross-talk may be efficiently avoided. This leads to improved signal to noise ratio of the light detection, which in turn leads to improved accuracy of measurement results of polarization content in the incident light.

According to a second aspect, there is provided a method for polarization dependent imaging, the method comprising:
  collecting, by a plurality of light propagating units, light incident at a collecting end of a respective funnel element of each light propagating unit of the plurality of light propagating units;
  propagating, for each light propagation unit, the light to a transmitting end of the funnel element, wherein a cross-section of the collecting end is larger than a cross-section of the transmitting end;
  receiving, at a receiving end of a waveguide of each light propagating unit, the light from the transmitting end, wherein the funnel element and the waveguide are asymmetrically coupled such that a central axis of the funnel element at the transmitting end is displaced with respect to a central axis of the waveguide at the receiving end;
  propagating, for each light propagation unit, the light to a distributing end of the waveguide, wherein the waveguide is a multimode waveguide, and wherein the propagating the light through the waveguide is dependent on polarization such that a distribution of the light at different locations of the distributing end is dependent on polarization of the light; and
  detecting, for each light propagating unit, the light at the distributing end, by at least two light sensitive elements of a plurality of light sensitive elements, such that each light sensitive element generates an electric signal dependent on an intensity of light incident onto the light sensitive element.

According to an embodiment, the propagating the light through the waveguide is further dependent on wavelength of the light.

According to an embodiment:
  the plurality of light sensitive elements is divided into a plurality of sub-sets of light sensitive elements, wherein all sub-sets of the plurality of sub-sets comprise an equal number of light sensitive elements;
  the plurality of light propagating units is divided into a plurality of clusters of light propagating units, wherein all clusters of the plurality of clusters comprise an equal number of light propagating units; and
  each sub-set of light sensitive elements is associated with a mutually unique cluster of light propagating units.

According to an embodiment, the method for polarization dependent imaging further comprises:
  performing reconstruction, by a processing unit, of a polarization content of the light incident onto the light sensitive elements, the reconstruction being based on the electric signals of the light sensitive elements and being performed independently within each sub-set of light sensitive elements, respectively.

According to an embodiment, the method for polarization dependent imaging further comprises:
  performing reconstruction, by a processing unit, of a wavelength spectrum of the light incident onto the light sensitive elements, the reconstruction being based on the electric signals of the light sensitive elements and being performed independently within each sub-set of light sensitive elements, respectively.

Effects and features of the second aspect are largely analogous to those described above in connection with the first aspect. Embodiments mentioned in relation to the first aspect are largely compatible with the second aspect. It is further noted that the inventive concepts relate to all possible combinations of features unless explicitly stated otherwise.

Other objectives, features and advantages of the present inventive concept will appear from the following detailed disclosure, from the attached claims as well as from the drawings.

BRIEF DESCRIPTIONS OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present inventive concept are described thereinafter according to a preferable embodiment, being not used to limit the claimed scope. This inventive concept may be embodied in many different forms and should not be construed as limited to the embodiments set forth herein; rather, these embodiments are provided for thoroughness and completeness, and fully convey the scope of the inventive concept to the skilled person.

Figure 1:
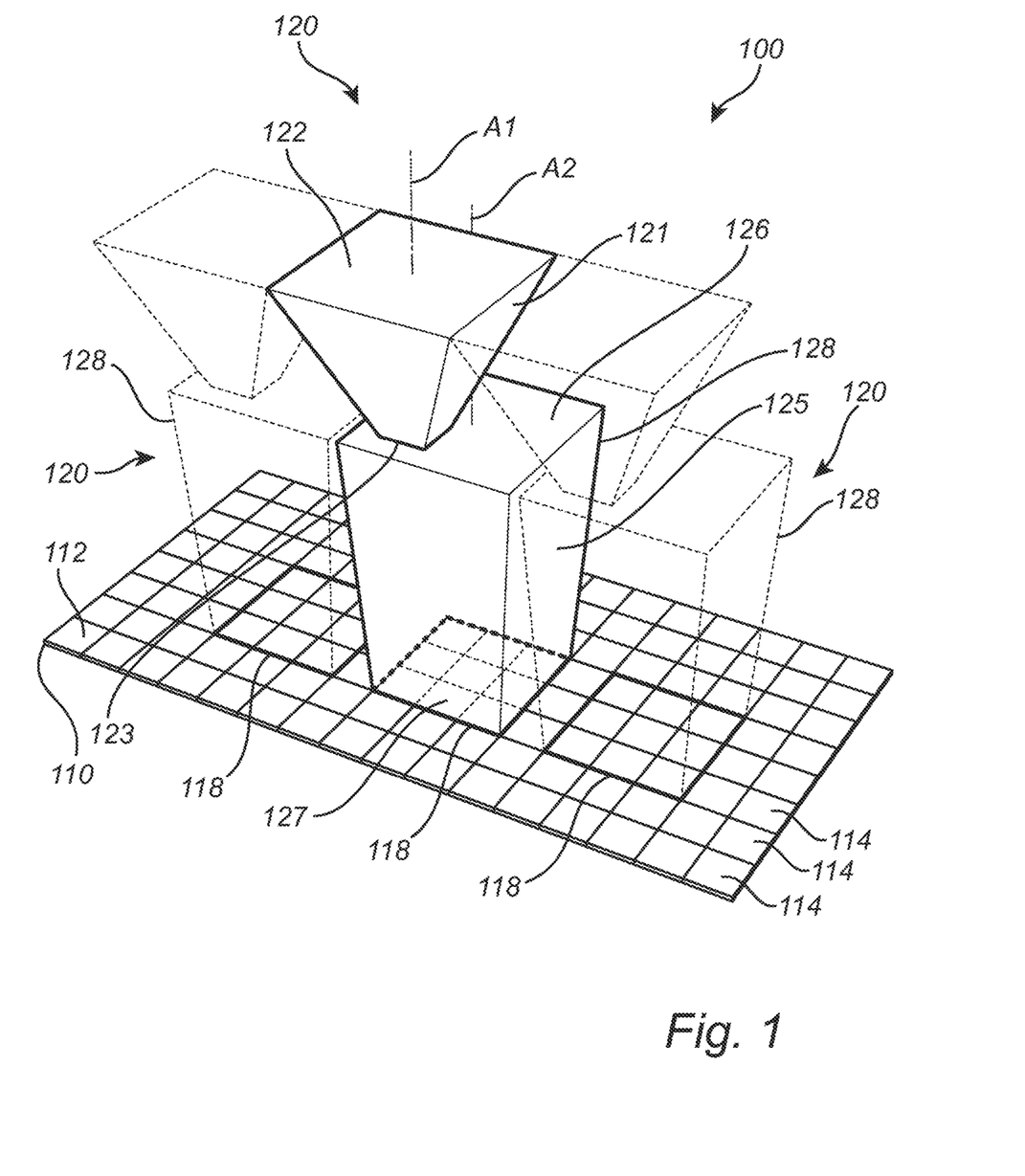
FIG. 1 schematically illustrates a device for polarization dependent imaging, comprising a single type of light propagating unit.

FIG. 1 schematically illustrates a device 100 for polarization dependent imaging.

The device 100 comprises a plurality of light propagating units 120. The light propagating units 120 of the device 100 are all of the same type. However, it is conceivable that the light propagating units 120 may be of a number of different types, as will be illustrated and discussed later.

Each respective light propagating unit 120 of the device 100 comprises a funnel element 121 having a collecting end 122 and an opposite transmitting end 123. The collecting ends 122 of the plurality of light propagating units 120 are arranged adjacent to each other leaving only small gaps, or no gaps, in between the different collecting ends 122. The collecting ends 122 are here illustrated to be arranged in perpendicular rows and columns such that the collecting ends 122 together form a planar surface. However, it is conceivable that the collecting ends 122 may be arranged in alternative manners.

Each respective funnel element 121 is configured to collect light incident at the collecting end 122. The light may come from an object being imaged by a lens (not shown here) onto the planar surface of collecting ends 122, however also other arrangements directing light onto the collecting ends 122 are conceivable.

The funnel element 121 is further configured to propagate the light from the collecting end 122 to the transmitting end 123. As illustrated in FIG. 1, the funnel element 121 is tapered such that the cross-section of the collecting end 122 is larger than the cross-section of the transmitting end 123.

Each respective light propagating units 120 of the device 100 comprises a waveguide 125 having a receiving end 126 and an opposite distributing end 127. The waveguide 125 is arranged such that the receiving end 126 is facing the transmitting end 123 of the funnel element 121. The waveguide 125 may be arranged such that the receiving end 126 is in direct contact with the transmitting end 123 of the funnel element 121. Alternatively, the waveguide 125 may be arranged such that a gap is formed between the receiving end 126 and the transmitting end 123.

The waveguide 125 is configured to receive the light from the transmitting end 123 at the receiving end 126. Most of the light, and preferably all the light, collected at the collecting end 122 of the funnel element 121 may be propagated to the transmitting end 123 and coupled into the waveguide 125 via the receiving end 126.

Optionally, one or more additional layers may be provided between transmitting end 123 and the receiving end 126. The one or more additional layers may enhance the coupling of light between the funnel element 121 and the waveguide 125.

The funnel element 121 and the waveguide 125 are asymmetrically coupled. More specifically the transmitting end 123 is coupled to the receiving end 126 such that the central axis A1 of the funnel element 121 at the transmitting end 123 is displaced with respect to the central axis A2 of the waveguide 125 at the receiving end 126.

The waveguide 125 is further configured to propagate the light to the distributing end 127. The waveguide 125 is a multimode waveguide configured to propagate the light through the waveguide 125 in dependence of polarization. By the present arrangement the distribution of the light at the distributing end 127 is dependent on polarization of the light. At the distributing end 127 the light may exit the waveguide 125.

The device 100 further comprises a detector 110 comprising a plurality of light sensitive elements 114 which here form an array 112 of light sensitive elements 114. The light sensitive elements 114 are arranged in a planar fashion in a plane of the detector 110. Although the light sensitive elements 114 are here illustrated to be arranged in perpendicular rows and columns of an array 112, it is conceivable that the light sensitive elements 114 may alternatively be arranged in other manners.

Each respective light propagating unit 120 is arranged with respect to the detector 110 such that the distributing end 127 is facing the array 112 of light sensitive elements 114. More specifically, each light propagating unit 120 is arranged such that the distributing end 127 is facing at least two, and in the present example nine, light sensitive elements 114. Thus, the light exiting the waveguide 126 at the distributing end 127 is incident onto the nine light sensitive elements 114 of the array 112 of light sensitive elements 114.

Each respective light sensitive element 114 is configured to generate an electric signal which is dependent on an intensity of the light incident onto the light sensitive element 114. Thus, the detector 100 may be an image detector such as charge-coupled devices (CCD) and complementary metal oxide semiconductors (CMOS), however the detector 100 may alternatively be of another type.

As illustrated in FIG. 1, the array 112 of light sensitive elements 114 is divided into a plurality of sub-sets of light sensitive elements 114, which here form sub-arrays 118 of light sensitive elements 114. All sub-arrays 118 comprise an equal number of light sensitive elements 114, in the present example nine light sensitive element 114. For each sub-array 118, the light sensitive elements 114 correspond to the light sensitive elements covered by the respective distributing end 127 of the light propagating unit 120.

Further, the plurality of light propagating units 120 is divided into a plurality of clusters 128 of light propagating units 120, each of which comprises a single light propagating unit 120.

Each respective cluster 128, and thus each light propagating unit 120, is arranged with respect to the sub-array 118 to which the cluster is associated, such that the distributing end 127 distributes the light onto all light sensitive elements 114 of the sub-array 118.

By the present arrangement each sub-array 118 may detect a characteristic intensity pattern of light from a point of an object being imaged, thereby each sub-array 118 may be regarded as a picture element. The characteristic intensity pattern results from the polarization dependent propagation of light in the waveguide 125. Thus, the pattern detected by the sub-array 118 is dependent on the polarization content of the light. The polarization content may therefore be reconstructed from the characteristic intensity pattern detected by the light sensitive elements 114 or the respective sub-arrays 118.

It should be understood that the waveguide 125 may optionally be further configured to propagate the light through the waveguide 114 in dependence of wavelength of the light, in addition to the dependence of polarization. In such a variation of the inventive concept, the distribution of the light at the distributing end 127 is dependent on polarization and wavelength of the received light. By way of example, the wavelengths of the light may be distributed by increasing wavelength from one edge of the distributing end 127 to an opposite edge of the distributing end 127. However, also other types of distributions based on wavelength are conceivable.

Figure 2A:
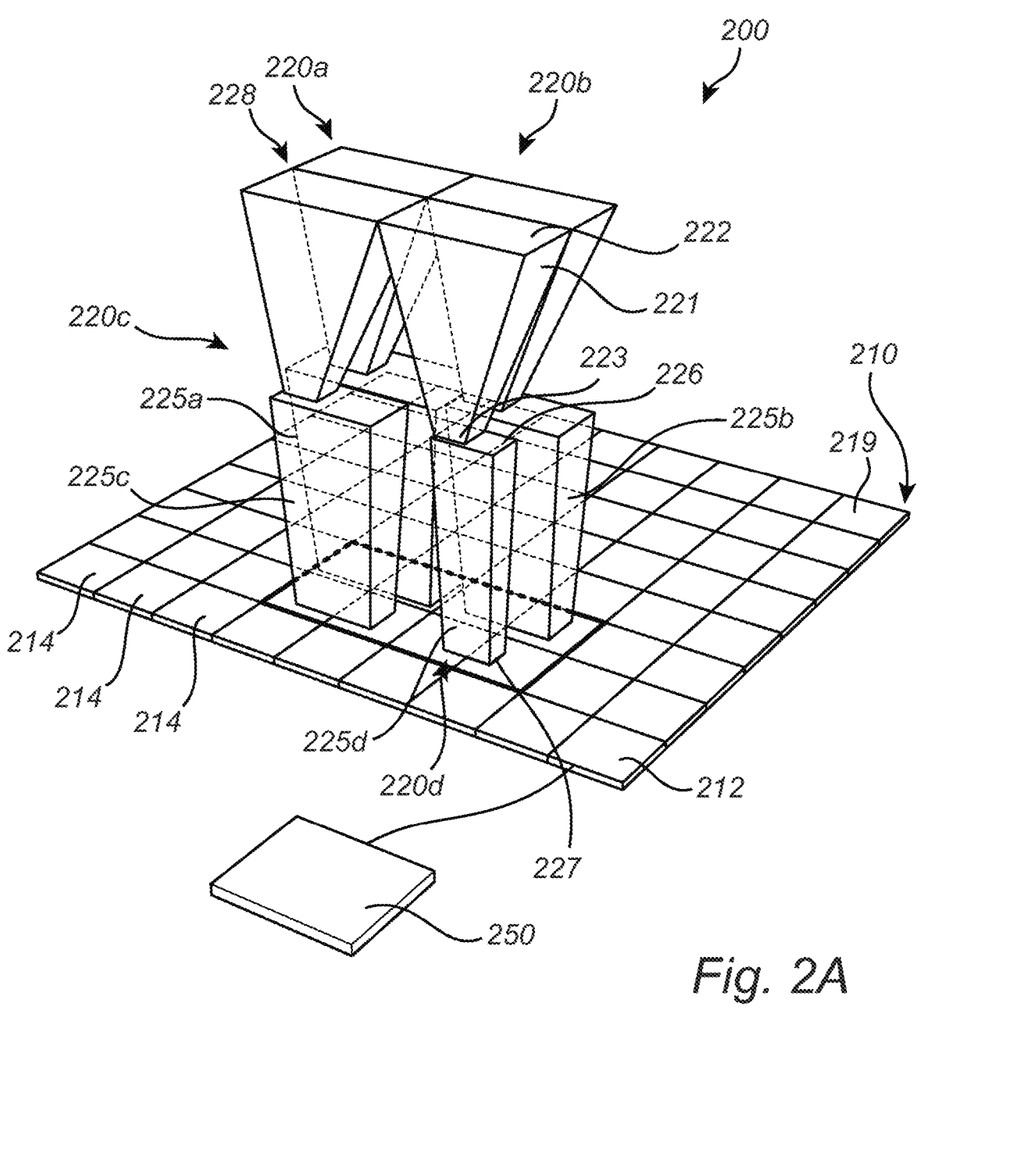
FIG. 2A schematically illustrates a device for polarization dependent imaging, comprising clusters of four different types of light propagating units.

FIG. 2A schematically illustrates a device 200 for polarization dependent imaging.

The device 200 comprises a plurality of light propagating units 220a-d. The light propagating units 220 of the device 200 are of four different types, a first type 220a, a second type 220b, a third type 220c, and a fourth type 220d.

Each respective light propagating unit 220a-d comprises a funnel element 221 having a collecting end 222 and an opposite transmitting end 223.

Each respective funnel element 221 is configured to collect light incident at the collecting end 222, and to propagate the light from the collecting end 222 to the transmitting end 223. Similarly to the funnel elements 121 illustrated in FIG. 1, each funnel element 221 is tapered such that the cross-section of the collecting end 222 is larger than the cross-section of the transmitting end 223.

Each of the four types of light propagating units 220a-d of the device 200 comprises a waveguide 225a-d, being one of four different types of waveguides, and having a receiving end 226 and an opposite distributing end 227. The waveguide 225a-d is arranged such that the receiving end 226 is facing the transmitting end 223 of the funnel element 221.

The waveguide 225a-d is configured to receive the light from the transmitting end 223 at the receiving end 226.

The device 200 further comprises a detector 210 comprising a plurality of light sensitive elements 214 which here form an array 212 of light sensitive elements 214. Each respective light propagating unit 220a-d is arranged with respect to the detector 210 such that the distributing end 227 is facing two light sensitive elements 214. Thus, the light exiting the waveguide 226 at the distributing end 227 is incident onto the two light sensitive elements 214 of the array 212 of light sensitive elements 214.

The plurality of light propagating units 220a-d is divided into a plurality of clusters 228 of light propagating units 220a-d, each of which comprises a one light propagating unit 220a-d of each of the four different types, i.e. the first type 220a, the second type 220b, the third type 220c, and the fourth type 220d.

It should be understood that the light propagation in the waveguides 225a-d is dependent on polarization in different ways for the different types of waveguides. Given as a non-limiting example, the first type of light propagating unit 220a may be configured to distribute light in dependence of content of vertically and horizontally linearly polarized light, whereas the second type of light propagating unit 220b may be configured to distribute light in dependence of content of clockwise and counterclockwise circularly polarized light. It is further conceivable that some of the types of light propagating units 220a-d may distribute light based on the polarization content, whereas some other types of light propagating units 220a-d may distribute light based on the wavelength content. By the present arrangement, different types of light propagating units 220a-d may be combined to form clusters 228 such that the light propagating units 220a-d within a cluster together distribute light such that all the different types of light of interest are distributed to form a characteristic intensity pattern. Thus, a number of light propagating units 220a-d may be selected based on their individual light distribution properties, and may be combined to form clusters of tailor-made advanced light distribution properties.

The array 212 of light sensitive elements 214 is divided into a plurality of sub-sets of light sensitive elements 214, which here form sub-arrays 218 of light sensitive elements 214. Each sub-array 218 corresponds to all the light sensitive elements 214 covered by the respective distributing ends 227 of the respective cluster 228. More specifically, for each respective cluster 228, the light propagating units 214 are arranged with respect to the sub-array 218 to which the cluster is associated, such that the distributing ends 227 of the light propagating units 220a-d in the cluster 228 together distribute light onto all light sensitive elements of the sub-array.

By the present arrangement each sub-array 218 may detect a characteristic intensity pattern of light from a point of an object being imaged, thereby each sub-array 218 may be regarded as a picture element. The characteristic intensity pattern results from the polarization dependent propagation of light in the respective waveguides 225a-d, combined onto the sub-array 218. Thus, the pattern detected by the sub-array 218 is dependent on the polarization content of the light, and may be reconstructed from the characteristic intensity pattern detected by the light sensitive elements 214 or the respective sub-arrays 218.

Each light sensitive element 214 comprises a light absorbing layer 219. The light absorbing layers 219 are configured such that light incident onto a light sensitive element 214 is absorbed by the light absorbing layer 219. In this manner, light incident onto the light sensitive element 214 is prevented from propagating to adjacent light sensitive elements 214. The absorbing layers 219 thus prevent cross-talk between the light sensitive elements 214. Improved signal to noise ratio of the light detection may thereby be provided, which in turn leads to improved accuracy of measurement results of polarization content in the incident light. Alternatively or additionally, the detector may be configured with Deep Trench Isolation, DTI, technology. In such an arrangement, each respective light sensitive element 214 is confined by a trench preventing light incident onto the light sensitive element 214 from propagating to adjacent light sensitive elements 214, in order to prevent cross-talk.

The device 200 further comprises a processing unit 250 configured to perform reconstruction of a polarization content of the light incident onto the light sensitive elements 214. The reconstruction may be based on the electric signals of the light sensitive elements 214 and may be performed independently within each sub-array 218 of light sensitive elements 214, respectively.

In the present embodiment, a sub-array 218 is formed by four adjacent light sensitive elements 214 in one row, and four adjacent light sensitive elements 214 in an adjacent row, whereby a 2×4 sub-array 218 is formed.

The reconstruction may involve comparing the detected characteristic intensity pattern of incident light with unknown polarization content to a number of reference intensity patterns acquired for incident light with known polarization content. More details on such data will be discussed in relation to FIG. 3.

By way of example, the reconstruction of the polarization content may comprise, but is not limited to, Stokes parameters for a set of polarization types for the light.

In addition to being configured to perform reconstruction of a polarization content of the light incident onto the light sensitive elements 214, the processing unit 250 may be further configured to perform reconstruction of a wavelength spectrum of the light incident onto the light sensitive elements 214.

Similarly to the reconstruction of the polarization content, the reconstruction of wavelength content may be based on the electric signals of the light sensitive elements 214 and may be performed independently within each sub-array 218 of light sensitive elements 214, respectively.

Figure 2B:
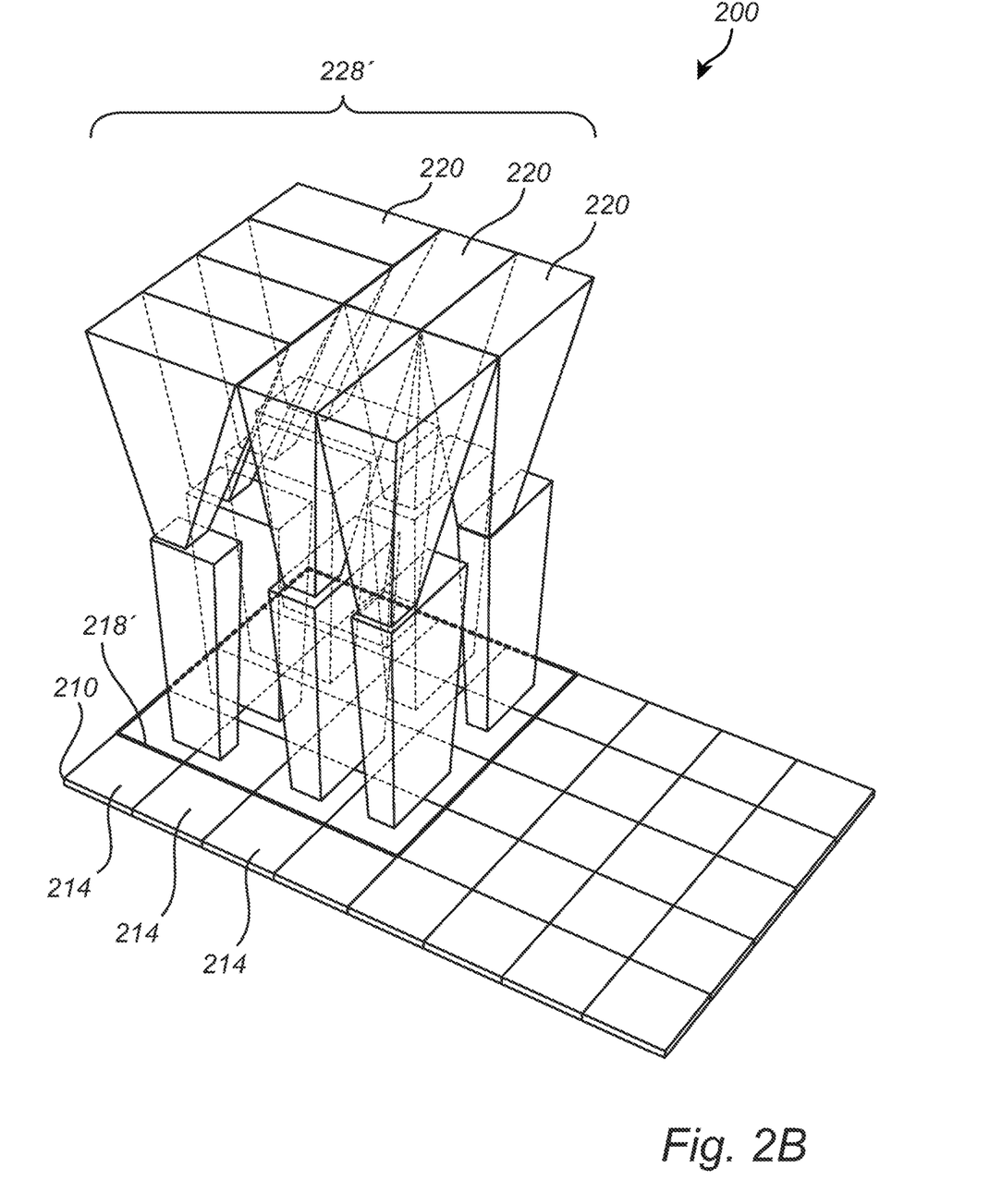
FIG. 2B schematically illustrates the device for polarization dependent imaging, comprising alternative clusters of eight different types of light propagating units.

FIG. 2B schematically illustrates the device 200 for polarization dependent imaging, with an alternative configuration of light propagating units 220.

In relation to FIG. 2A the device 200 for polarization dependent imaging was described as having four different types light propagating units 220 within each cluster 228. However, it should be understood that the cluster 228 is not limited to being configured as described in relation to FIG. 2A. By way of example, the cluster is not limited to comprising four light propagating units, but may alternatively comprise two, three, five, six, seven, eight, or more light propagating units 220. Further, the light propagating units 220 are not limited to being arranged in the same direction, e.g. along the different rows of light sensitive elements 214 of the detector 210.

In FIG. 2B an alternative configuration is schematically illustrated. The cluster 228' comprises eight light propagating units 220. The light propagating units 220 may be of different types, with different light propagation properties dependent on polarization and optionally wavelength. As shown in FIG. 2B, four of the light propagating units 220 are arranged along rows of the light sensitive elements 214 of the detector. The remaining four light propagating units 220 are instead arranged along columns of light sensitive elements 214 of the detector. Combined, the light propagating units 220 form an alternative cluster 228' with alternative properties of light propagation and thus an alternative distribution of light onto the sub-array 218' may be provided.

Figure 3:
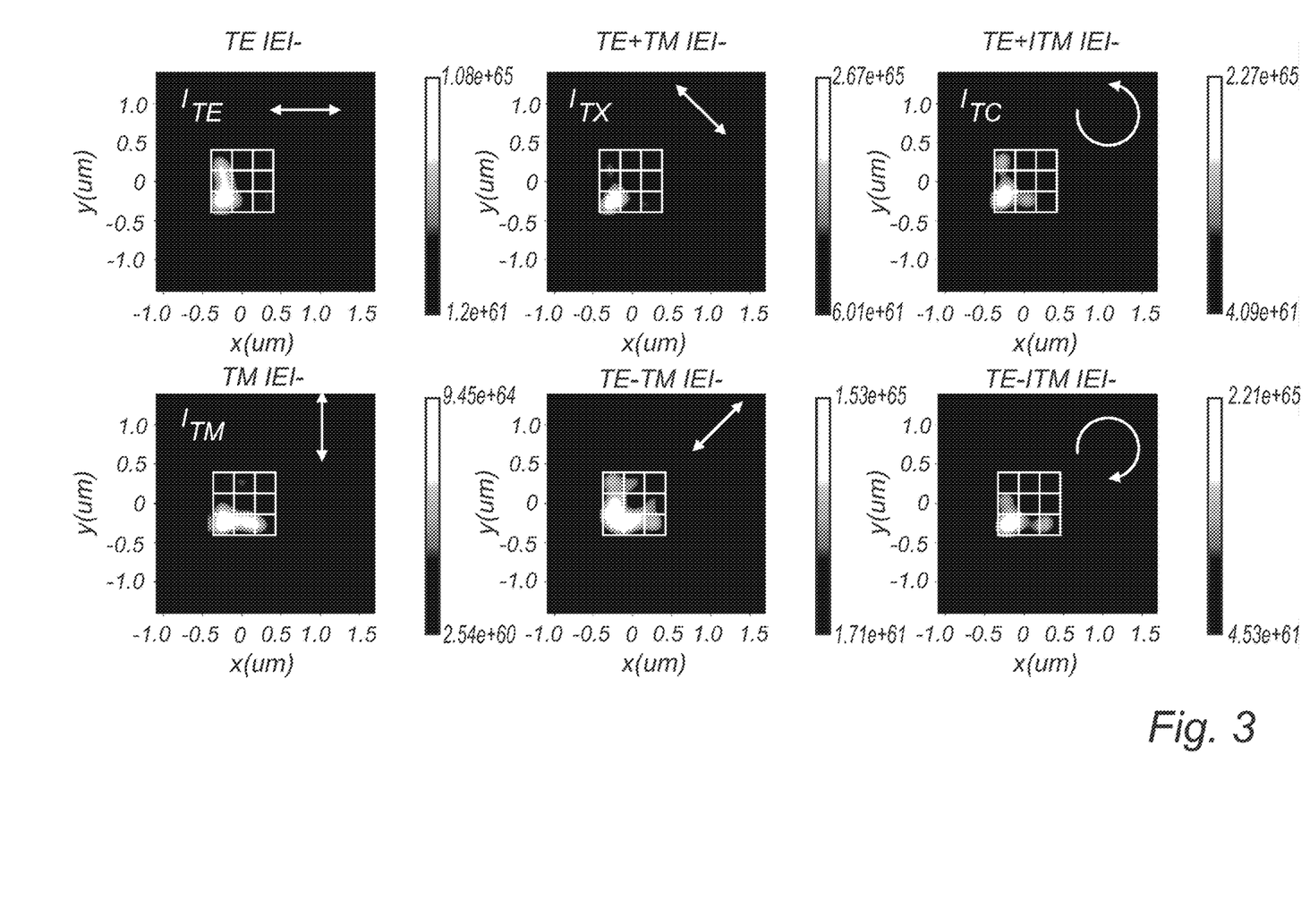
FIG. 3 illustrates a set of examples of light intensity distributions detected by a 3×3 sub-array of light sensitive elements, for incident light with known polarization content.

FIG. 3 illustrates a set of examples of light intensity distributions detected by a 3×3 sub-array of light sensitive elements, for incident light with known polarization content. Although not illustrated here, the cluster of light propagating units may comprise only a single light propagating unit covering all nine light sensitive elements. Such a configuration would for example correspond to the device 100 illustrated in FIG. 1.

In the left column of FIG. 3, the characteristic intensity pattern is shown resulting from incident light being purely horizontally polarized (upper) and vertically polarized (lower), respectively. The horizontally polarized light results in a light intensity starting at the lower left light sensitive element of the sub-array, and essentially extending vertically along the left column of light sensitive elements. Contrary, the vertically polarized light results in a light intensity starting at the lower left light sensitive element of the sub-array, and essentially extending horizontally along the bottom row of light sensitive elements. Both patterns are recognizable to the human eye. However, other types of polarization content may result in more complicated characteristic intensity patterns not so easily recognizable to the human eye.

In the center column of FIG. 3, the characteristic intensity pattern is shown resulting from incident light being purely linearly polarized, but with an angle of 45° with respect to the linearly polarized light in the left column of FIG. 3. The top diagram shows an intensity pattern largely concentrated to the lower leftmost light sensitive element. The bottom diagram, however, shows an intensity pattern that is spread out across several of the light sensitive elements.

In the right column of FIG. 3, the characteristic intensity pattern is shown resulting from incident light being purely counterclockwise circularly polarized (upper) and clockwise circularly polarized, respectively. Both diagrams show a centered intensity at the lower left light sensitive element, with different degrees of light intensity being distributed mainly in the leftmost column and the bottom row of the sub-array.

The set of data illustrated in FIG. 3 may be used as a set of reference data. The data set may be stored on computer memory readable by the processing unit. The data set may alternatively be stored in an internal memory of the processing unit.

The processing unit may use the reference data to compare it to an input characteristic intensity pattern of incident light with unknown polarization content, in order to determine the polarization content of the incident light, for the respective sub-arrays. Given as a non-limiting example, the algorithm for determining the polarization content may involve multiplying each of the references in the set of references with individual weighting factors to reflect the intensity of the different polarization components in the incident light, and to add the weighted references together in order to reconstruct the characteristic intensity pattern as detected by the sub-array. The weighting factors resulting in an intensity pattern being the most similar to the detected intensity pattern, within a certain threshold of deviation, may be used to represent the polarization content of the incident light.

Practically from the set of reference data, a matrix may be constructed wherein each column represents the response for a set of polarization. To reconstruct the polarization content of unknown incident light, a pseudoinverse matrix is used onto the detected light of the sub-array.

Figure 4:
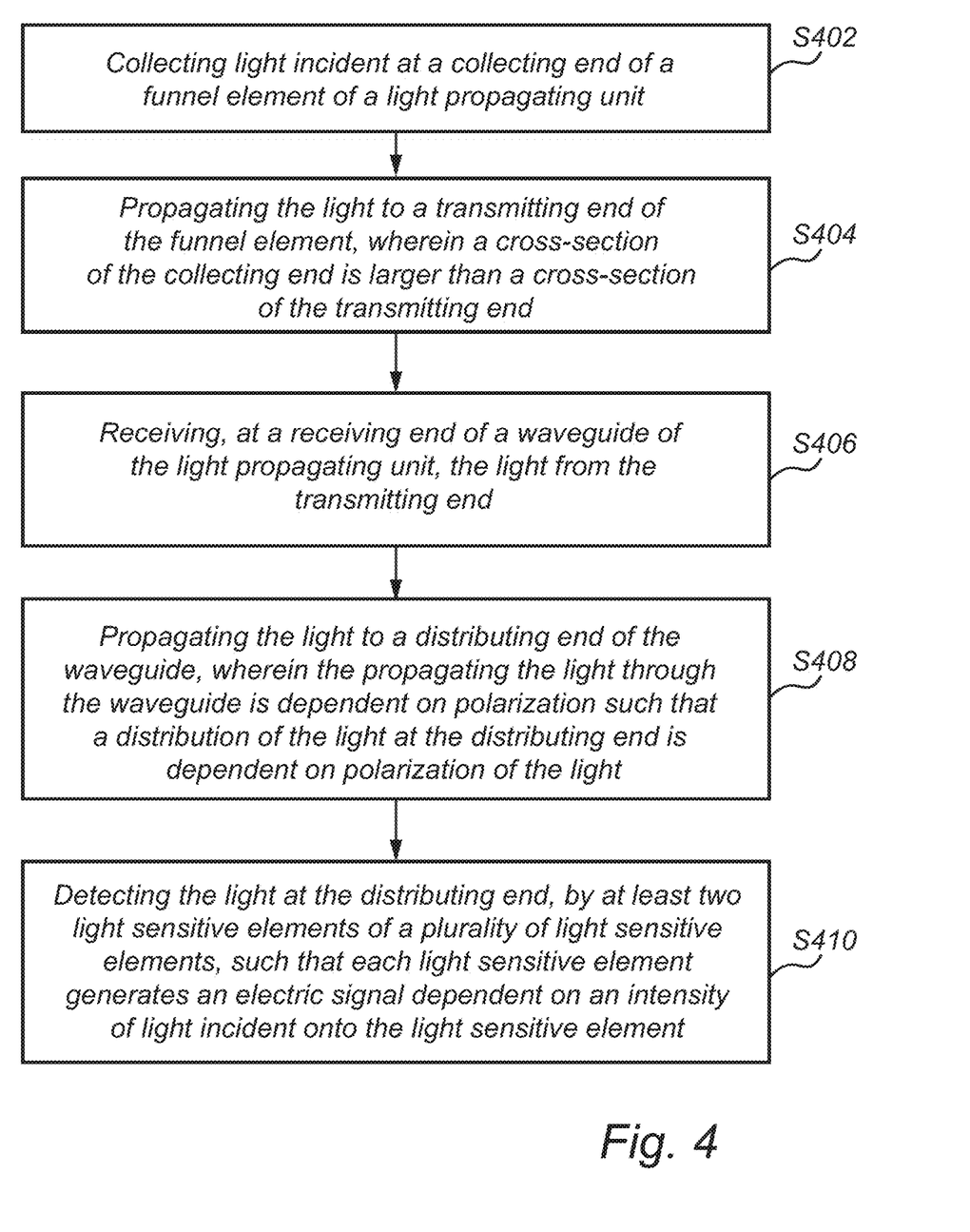
FIG. 4 illustrates a schematic block diagram shortly summarizing the method for polarization dependent imaging.

FIG. 4 illustrates a schematic block diagram shortly summarizing the method for polarization dependent imaging. It should be understood that the steps of the method, although listed in a specific order herein, may be performed in any order suitable.

The method may comprise collecting S402, by a plurality of light propagating units, light incident at a collecting end of a respective funnel element of each light propagating unit of the plurality of light propagating units.

The method may comprise propagating S404, for each light propagation unit, the light to a transmitting end of the funnel element, wherein a cross-section of the collecting end is larger than a cross-section of the transmitting end. The propagating the light through the waveguide may be further dependent on wavelength of the light.

The method may comprise receiving S406, at a receiving end of a waveguide of each light propagating unit, the light from the transmitting end, wherein the funnel element and the waveguide are asymmetrically coupled such that a central axis of the funnel element at the transmitting end is displaced with respect to a central axis of the waveguide at the receiving end.

The method may comprise propagating S408, for each light propagation unit, the light to a distributing end of the waveguide, wherein the waveguide is a multimode waveguide, and wherein the propagating the light through the waveguide is dependent on polarization such that a distribution of the light at the distributing end is dependent on polarization of the light.

The method may comprise detecting S410, for each light propagating unit, the light at the distributing end, by at least two light sensitive elements of a plurality of light sensitive elements, such that each light sensitive element generates an electric signal dependent on an intensity of light incident onto the light sensitive element. The plurality of light sensitive elements may form an array of light sensitive elements which may be divided into a plurality of sub-arrays of light sensitive elements, wherein all sub-arrays of the plurality of sub-arrays comprise an equal number of light sensitive elements.

The plurality of light propagating units may be divided into a plurality of clusters of light propagating units, wherein all clusters of the plurality of clusters comprise an equal number of light propagating units. Each sub-array of light sensitive elements may be associated with a mutually unique cluster of light propagating units.

The method may further comprise performing reconstruction, by a processing unit, of a polarization content of the light incident onto the light sensitive elements, the reconstruction being based on the electric signals of the light sensitive elements and being performed independently within each sub-array of light sensitive elements, respectively.

The method may further comprise performing reconstruction, by a processing unit, of a wavelength spectrum of the light incident onto the light sensitive elements, the reconstruction being based on the electric signals of the light sensitive elements and being performed independently within each sub-array of light sensitive elements, respectively.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for polarization dependent imaging, the device comprising:
   a detector comprising a plurality of light sensitive elements, wherein each light sensitive element is configured to generate an electric signal dependent on an intensity of light incident onto the light sensitive element;
   a plurality of light propagating units, wherein each light propagating unit of the plurality of the light propagating units comprises:
      a funnel element having a collecting end and a transmitting end, the funnel element being configured to collect light incident at the collecting end and to propagate the light to the transmitting end, wherein a cross-section of the collecting end is larger than a cross-section of the transmitting end;
      a waveguide having a receiving end and a distributing end, the waveguide being configured to receive the light from the transmitting end at the receiving end and to propagate the light to the distributing end, wherein the waveguide is a multimode waveguide configured to propagate the light through the waveguide in dependence of polarization such that a distribution of the light at different locations of the distributing end is dependent on polarization of the light;
      wherein the funnel element and the waveguide are asymmetrically coupled such that a central axis of the funnel element at the transmitting end is displaced with respect to a central axis of the waveguide at the receiving end; and
   wherein, for each light propagating unit, the light propagating unit is arranged with respect to the detector such that the light at the distributing end is incident onto at least two light sensitive elements of the plurality of light sensitive elements.

2. The device for polarization dependent imaging according to claim 1, wherein the waveguide is further configured to propagate the light through the waveguide in dependence of wavelength such that a distribution of the light at different locations of the distributing end is dependent on polarization and wavelength of the received light.

3. The device for polarization dependent imaging according to claim 1, wherein the plurality of light sensitive elements is divided into a plurality of sub-sets of light sensitive elements, wherein all sub-sets of the plurality of sub-sets comprise an equal number of light sensitive elements, and wherein the plurality of light propagating units is divided into a plurality of clusters of light propagating units, wherein all clusters of the plurality of clusters comprise an equal number of light propagating units, and wherein each sub-set of light sensitive elements is associated with a mutually unique cluster of light propagating units.

4. The device for polarization dependent imaging according to claim 3, wherein each respective cluster comprises a single light propagating unit being arranged with respect to the sub-set to which the cluster is associated, such that the distributing end distributes the light onto all light sensitive elements of the sub-set.

5. The device for polarization dependent imaging according to claim 3, wherein each respective cluster comprises at least a light propagating unit of a first type and a light propagating unit of a second type, wherein a dependence of polarization in the waveguide of the light propagating unit of the first type is different from a dependence of polarization in the waveguide of the light propagating unit of the second type, and wherein, for each respective cluster, the light propagating units are arranged with respect to the sub-set to which the cluster is associated, such that the distributing ends of the light propagating units in the cluster together distribute light onto all light sensitive elements of the sub-set.

6. The device for polarization dependent imaging according to claim 3, further configured to perform reconstruction of a polarization content of the light incident onto the light sensitive elements, the reconstruction being based on the electric signals of the light sensitive elements and being performed independently within each sub-set of light sensitive elements, respectively.

7. The device for polarization dependent imaging according to claim 6, wherein the reconstruction of the polarization content comprises Stokes parameters for a set of polarization types for the light.

8. The device for polarization dependent imaging according to claim 6, wherein the waveguide is further configured to propagate the light through the waveguide in dependence of wavelength such that a distribution of the light at different locations of the distributing end is dependent on polarization and wavelength of the received light, and
wherein the device is further configured to perform reconstruction of a wavelength spectrum of the light incident onto the light sensitive elements, the reconstruction being based on the electric signals of the light sensitive elements and being performed independently within each sub-set of light sensitive elements, respectively.

9. The device for polarization dependent imaging according to claim 1, wherein each light sensitive element comprises a light absorbing layer configured such that light incident onto the light sensitive element is absorbed by the light absorbing layer, thereby preventing light incident onto the light sensitive element from propagating to adjacent light sensitive elements.

10. The device for polarization dependent imaging according to claim 1, wherein the detector is configured with Deep Trench Isolation, DTI, technology such that each respective light sensitive element is confined by a trench preventing light incident onto the light sensitive element from propagating to adjacent light sensitive elements.

11. A method for polarization dependent imaging, the method comprising:
collecting, by a plurality of light propagating units, light incident at a collecting end of a respective funnel element of each light propagating unit of the plurality of light propagating units;
propagating, for each light propagation unit, the light to a transmitting end of the funnel element, wherein a cross-section of the collecting end is larger than a cross-section of the transmitting end;
receiving, at a receiving end of a waveguide of each light propagating unit, the light from the transmitting end, wherein the funnel element and the waveguide are asymmetrically coupled such that a central axis of the funnel element at the transmitting end is displaced with respect to a central axis of the waveguide at the receiving end;
propagating, for each light propagation unit, the light to a distributing end of the waveguide, wherein the waveguide is a multimode waveguide, and wherein the propagating the light through the waveguide is dependent on polarization such that a distribution of the light at different locations of the distributing end is dependent on polarization of the light; and
detecting, for each light propagating unit, the light at the distributing end, by at least two light sensitive elements of a plurality of light sensitive elements, such that each light sensitive element generates an electric signal dependent on an intensity of light incident onto the light sensitive element.

12. The method for polarization dependent imaging according to claim 11, wherein the propagating the light through the waveguide is further dependent on wavelength of the light.

13. The method for polarization dependent imaging according to claim 11, wherein:
the plurality of light sensitive elements is divided into a plurality of sub-sets of light sensitive elements, wherein all sub-sets of the plurality of sub-sets comprise an equal number of light sensitive elements;
the plurality of light propagating units is divided into a plurality of clusters of light propagating units, wherein all clusters of the plurality of clusters comprise an equal number of light propagating units; and
each sub-set of light sensitive elements is associated with a mutually unique cluster of light propagating units.

14. The method for polarization dependent imaging according to claim 13, further comprising:
performing reconstruction of a polarization content of the light incident onto the light sensitive elements, the reconstruction being based on the electric signals of the light sensitive elements and being performed independently within each sub-set of light sensitive elements, respectively.

15. The method for polarization dependent imaging according to claim 14, further comprising:
performing reconstruction of a wavelength spectrum of the light incident onto the light sensitive elements, the reconstruction being based on the electric signals of the light sensitive elements and being performed independently within each sub-set of light sensitive elements, respectively.

* * * * *